US008793023B2

(12) United States Patent
Vanderlaan et al.

(10) Patent No.: US 8,793,023 B2
(45) Date of Patent: Jul. 29, 2014

(54) METHOD OF CONTROLLING AN ELECTRO-HYDRAULIC ACTUATOR SYSTEM HAVING MULTIPLE ACTUATORS

(75) Inventors: Dale Vanderlaan, Kalamazoo, MI (US); Ralf Gomm, Cleveland, OH (US); Amir Shenouda, Avon Lake, OH (US)

(73) Assignee: Parker Hannifin Corporation, Cleveland, OH (US)

( * ) Notice: Subject to any disclaimer, the term of this patent is extended or adjusted under 35 U.S.C. 154(b) by 476 days.

(21) Appl. No.: 13/062,305

(22) PCT Filed: Sep. 11, 2009

(86) PCT No.: PCT/US2009/056586

§ 371 (c)(1), (2), (4) Date: May 17, 2011

(87) PCT Pub. No.: WO2010/030830

PCT Pub. Date: Mar. 18, 2010

(65) Prior Publication Data

US 2011/0208363 A1 Aug. 25, 2011

Related U.S. Application Data

(60) Provisional application No. 61/096,033, filed on Sep. 11, 2008.

(51) Int. Cl.
*G05D 7/06* (2006.01)

(52) U.S. Cl.
USPC .............................. 700/282; 700/275; 701/50

(58) Field of Classification Search
None
See application file for complete search history.

(56) References Cited

U.S. PATENT DOCUMENTS

| | | | |
|---|---|---|---|
| 2,742,128 | A | 4/1956 | Woodson |
| 3,175,500 | A | 3/1965 | Zeigler |
| 3,426,650 | A | 2/1969 | Jenney |
| 3,665,809 | A | 5/1972 | Walker et al. |
| 3,928,968 | A | 12/1975 | Becker et al. |
| 4,175,628 | A | 11/1979 | Cornell et al. |
| 4,472,998 | A | 9/1984 | Vanderlaan |
| 4,712,376 | A | 12/1987 | Hadank et al. |
| 4,881,450 | A | 11/1989 | Hirata et al. |
| 5,144,801 | A | 9/1992 | Scanderbeg et al. |

(Continued)

FOREIGN PATENT DOCUMENTS

| | | |
|---|---|---|
| JP | 2001-002371 | 1/2001 |
| WO | 2006135743 A2 | 12/2006 |

OTHER PUBLICATIONS

International Search Report and Written Opinion of corresponding International Application No. PCT/US2009/033720 dated Sep. 2, 2009.

(Continued)

*Primary Examiner* — Ryan Jarrett
(74) *Attorney, Agent, or Firm* — Renner, Otto, Boisselle & Sklar, LLP.

(57) ABSTRACT

A method of controlling an electro-hydraulic actuator system having multiple functions includes the steps of: receiving input signals corresponding to a desired operation of the functions of the system; establishing an operating limit for the system; determining an operating characteristic of the system; using the operating limit and the determined operating characteristic to determine a limitation control factor; and influencing the received input signal with the determined limitation control factor for operating the system within the established operating limit.

8 Claims, 14 Drawing Sheets

(56) References Cited

U.S. PATENT DOCUMENTS

| | | | |
|---|---|---|---|
| 5,191,753 | A | 3/1993 | Fachini et al. |
| 5,214,916 | A | 6/1993 | Lukich |
| 5,511,459 | A | 4/1996 | Hanser et al. |
| 5,653,155 | A | 8/1997 | Hausman et al. |
| 5,678,786 | A | 10/1997 | Osder |
| 5,806,805 | A | 9/1998 | Elbert et al. |
| 6,282,891 | B1 | 9/2001 | Rockwood |
| 6,389,922 | B1 | 5/2002 | Krieger |
| 6,662,705 | B2 | 12/2003 | Huang et al. |
| 6,883,394 | B2 | 4/2005 | Koenig et al. |
| 6,912,849 | B2 | 7/2005 | Inoue et al. |
| 6,962,050 | B2 | 11/2005 | Hiraki et al. |
| 7,037,231 | B2 | 5/2006 | Showalter |
| 2007/0227478 | A1 | 10/2007 | Fitzgerald |
| 2008/0182719 | A1 | 7/2008 | Long et al. |
| 2010/0037604 | A1 * | 2/2010 | Rampen et al. ................. 60/445 |

OTHER PUBLICATIONS

International Preliminary Report on Patentability of corresponding International Application No. PCT/US2009/033720, dated Jun. 2, 2010.

* cited by examiner

METHOD OF CONTROLLING AN ELECTRO-HYDRAULIC ACTUATOR SYSTEM HAVING MULTIPLE ACTUATORS

CROSS REFERENCE TO RELATED APPLICATIONS

The present application claims the benefit of the filing date of U.S. Provisional Patent Application Ser. No. 61/096,033, filed on Sep. 11, 2008, the disclosure of which is incorporated herein by reference in its entirety.

TECHNICAL FIELD

The present invention relates to a method of controlling an electro-hydraulic actuator system having multiple functions.

BACKGROUND OF THE INVENTION

It is common for a work machine to have multiple functions with each function having at least one actuator. For example, a wheel loader has a lift function and a tilt function. Commonly, in such machines, a prime mover drives a hydraulic pump for providing fluid to the actuators. Open-center valves control the flow of fluid to the actuators.

Some modern machines have replaced the traditional hydraulic system described above with an electro-hydraulic actuators ("EHA") system. An EHA includes a reversible, variable speed electric motor that is connected to a hydraulic pump, generally fixed displacement, for providing fluid to an actuator for controlling motion of the actuator. The speed and direction of the electric motor controls the flow of fluid to the actuator. Power for the electric motor is received from a generator, a power storage unit, such as a battery, or both. A system that includes an EHA is referred to herein as an electro-hydraulic actuator (EHA) system.

SUMMARY

The present invention relates to a method of controlling an electro-hydraulic actuator system having multiple functions. The method comprises the steps of: receiving input signals corresponding to a desired operation of the functions of the system; establishing an operating limit for the system; determining an operating characteristic of the system; using the operating limit and the determined operating characteristic to determine a limitation control factor; and influencing the received input signal with the determined limitation control factor for operating the system within the established operating limit.

BRIEF DESCRIPTION OF THE DRAWINGS

Embodiments of this invention will now be described in further detail with reference to the accompanying drawings, in which.

DETAILED DESCRIPTION

Figure 1:
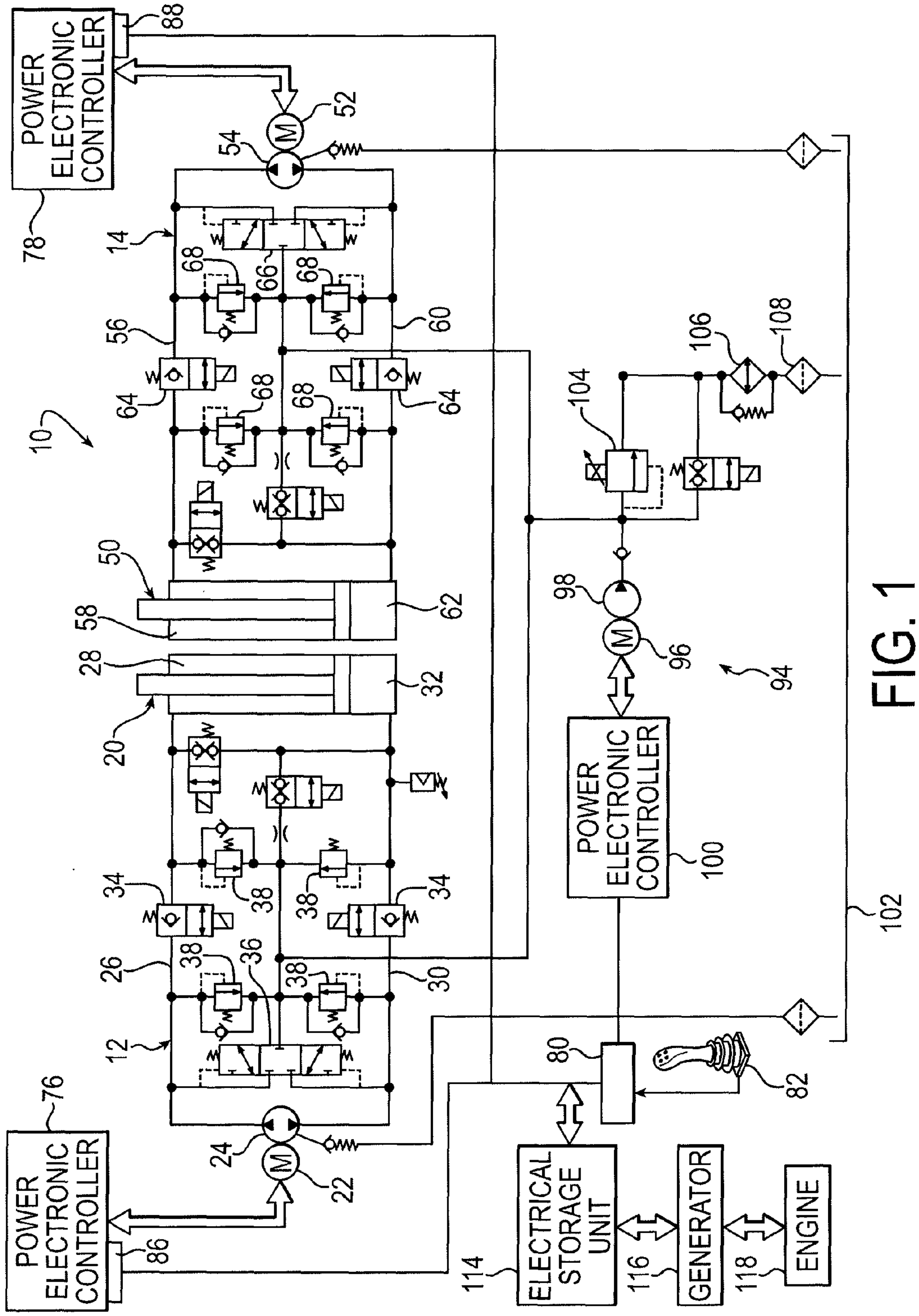
FIG. 1 illustrates an exemplary electro-hydraulic actuator system having multiple functions.

FIG. 1 illustrates an exemplary electro-hydraulic actuator system 10 having multiple functions 12 and 14. For ease of description, each function 12 and 14 of FIG. 1 has only a single actuator. Those skilled in the art should recognize that the system 10 may have more than two functions. Additionally, each function may have any number of actuators.

Function 12 in FIG. 1 is illustrated as a first electro-hydraulic actuator sub-system and includes an actuator 20, an electric motor 22 and a hydraulic pump 24. The electric motor 22 is a reversible, variable speed electric motor that is coupled to the hydraulic pump 24 and is operable for driving the hydraulic pump. The hydraulic pump 24 illustrated in FIG. 1 is a fixed displacement, two port hydraulic pump. Alternatively, other types of pumps, such as a variable displacement pump or a three port fixed displacement pump, may be used. When driven in a first direction by the electric motor 22, the hydraulic pump 24 of FIG. 1 provides fluid into conduit 26, which is associated with a rod side chamber 28 of the actuator 20. Fluid flows into the rod side chamber 28 of the actuator 20 during motion of the actuator in a retraction direction. When driven in a second direction opposite the first direction, the hydraulic pump 24 provides fluid into conduit 30, which is associated with a head side chamber 32 of the actuator 20. Fluid flows into the head side chamber of the actuator during motion of the actuator in an extension direction. The first elector-hydraulic actuator sub-system 12 also includes a plurality of valves. Some of the valves illustrated in FIG. 1 include load holding valves 34, a shuttle valve 36, and a number of pressure operated control valves 38.

Similarly, function 14 in FIG. 1 is illustrated as a second electro-hydraulic actuator sub-system and includes an actuator 50, an electric motor 52 and a hydraulic pump 54. The electric motor 52 is a reversible, variable speed electric motor that is coupled to the hydraulic pump 54 and is operable for driving the hydraulic pump. The hydraulic pump 54 illustrated in FIG. 1 is a fixed displacement, two port hydraulic pump. Alternatively, other types of pumps, such as a variable displacement pump or a three port fixed displacement pump, may be used. When driven in a first direction by the electric motor 52, the hydraulic pump 54 of FIG. 1 provides fluid into conduit 56, which is associated with a rod side chamber 58 of the actuator 50. Fluid flows into the rod side chamber 58 of the actuator 50 during motion of the actuator in a retraction direction. When driven in a second direction opposite the first direction, the hydraulic pump 54 provides fluid into conduit 60, which is associated with a head side chamber 62 of the actuator 50. Fluid flows into the head side chamber 62 of the actuator 50 during motion of the actuator in an extension direction. The first elector-hydraulic actuator sub-system 12 also includes a plurality of valves. Some of the valves illustrated in FIG. 1 include load holding valves 64, a shuttle valve 66, and a number of pressure operated control valves 68.

Each of the first and second electro-hydraulic actuator sub-systems 12 and 14 includes an associated power electric controller 76 and 78, respectively. Power electric controllers 76 and 78 may be formed as separate units, as is illustrated in FIG. 1, or as a single unit. The power electric controllers 76 and 78 control the flow of electric current to their associated electric motors 22 and 52, respectively, and thus, control the speed and direction of rotation of the electric motors 22 and 52. The power electronic controllers 76 and 78 receive velocity command signals from a system controller 80. The system controller 80 receives input (or command) signals from an operator input device, such as a joystick 82 or similar device. The system controller 80 is responsive to the input signals for determining velocities for the electric motors 22 and 52. The system controller 80 provides velocity command signals to the power electronic controllers 76 and 78 for controlling the electric motors 22 and 52 in accordance with the determined velocities. Each power electric controller 76 and 78 also includes a feedback device 86 and 88, respectively, that is operative to sense the actual speed and load of the electric motor 22 and 52 and to output feedback signals indicative of the sensed speed and load.

The system 10 of FIG. 1 also includes a charge pump sub-system 94. The charge pump sub-system 94 is in communication with the first and second electro-hydraulic actuator sub-systems 12 and 14 via the shuttle valves 36 and 66, respectively. The shuttle valves 36 and 66 automatically change position in response to a pressure differential to connect the low pressure conduit to the charge pump sub-system 94. The charge pump sub-system 94 includes an electric motor 96 operatively coupled to a fixed displacement hydraulic charge pump 98. The electric motor 96 receives power from an associated power electronic controller 100, which may be a separate device from power electronic controllers 76 and 78 as is illustrated in FIG. 1 or may be a common device as one or both of the power electronic controllers. Upon receiving electric power, the electric motor 96 drives the charge pump 98 to draw fluid from a reservoir 102 and to provide the fluid to the shuttle valves 36 and 66. A flow control valve 104, which is controlled by the system controller 80, controls the flow of fluid into and out of the charge pump sub-system 94. An oil cooler 106 and a filter 108 are located downstream of flow control valve 104. The charge pump sub-system 94 functions to provide fluid to the inlet side of the pumps 24 and 54 to prevent cavitation and to make up or receive any differential in fluid resulting from the actuators 20 and 50 being unbalanced. In addition to receiving fluid from the charge pump sub-system 94, fluid exiting one of the first and second electro-hydraulic sub-systems 12 and 14 may be directed to the shuttle valve 36 or 66 of the other of the first and second electro-hydraulic sub-systems.

FIG. 1 also illustrates an electric storage unit 114, such as a battery or capacitor, an electric power generator 116, and an internal combustion engine 118. As illustrated in FIG. 1, the internal combustion engine 118 drives the generator 116 to generate electric power for storage in the electric storage unit 114 or for use in the system 10.

The system 10 is adapted to be responsive to various characteristics to modify the input signals provided by the operator input device 82. For example, when functions 12 and 14 are commanded at the same time, the simultaneous demand for electric power for performing the commanded functions may exceed the electric power available from the electric storage unit 114 and/or the generator 116. In such instances, the functions 12 and 14 can not be actuated at the speeds indicated by the input signals from the operator input device 82. The system 10 is responsive to this characteristic, for example, to modify the inputs signals to enable operation of the functions 12 and 14 with the available electric power.

Figure 2:
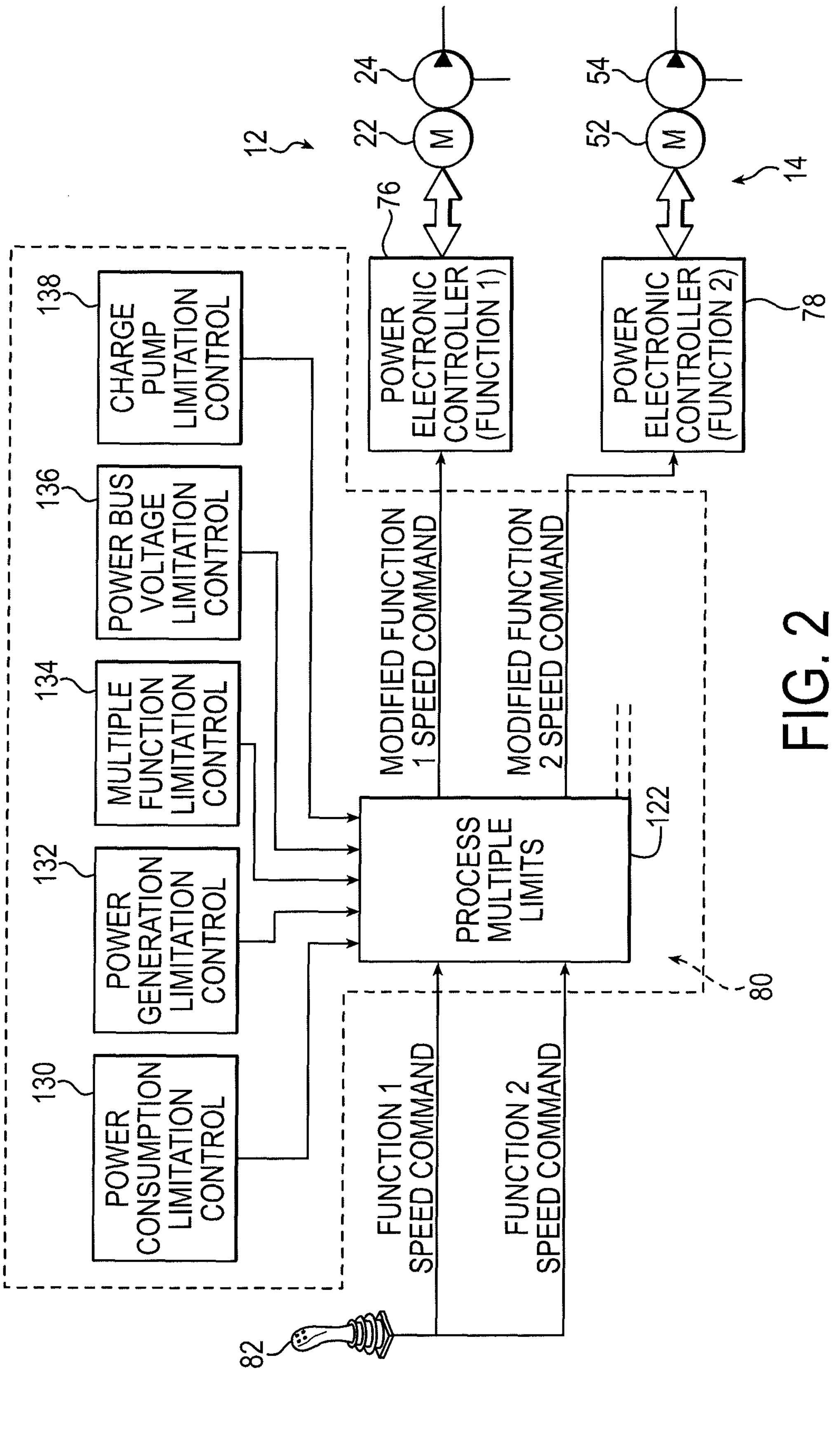
FIG. 2 illustrates an exemplary control diagram for the system of FIG. 1.

FIG. 2 illustrates an exemplary control diagram for the system 10 of FIG. 1. In FIG. 2, operator input signals from the operator input device, illustrated as a joystick 82, are fed to a processing unit 122 of the system controller 80. As will be described in additional detail below, the processing unit 122 determines one or more limitation control factors and uses at least one of the determined limitation control factors to modify the input signals. FIG. 2 illustrates the limitation control factors as including a power consumption limitation control factor 130, a power generation limitation control factor 132, a multiple function limitation control factor 134, a power bus voltage limitation control factor 136 and a charge pump limitation control factor 138. Each of these limitation control factors is described in further detail below.

Power Consumption Limitation Control Factor

The electric motors 22 and 52 in the system 10 of FIG. 1 are powered by electric power provided by the electrical storage unit 114. In some instances, the electric power demand associated with actuation of one of the functions 12 or 14 exceeds a predefined maximum power limit. This predefined maximum power limit is a characteristic of the system 10 and not a characteristic of the electric motor 12 or 14. When discussing this predefined maximum power limit, it is assumed that the electric motor 12 or 14 is operating in its normal power range.

Figure 3A:
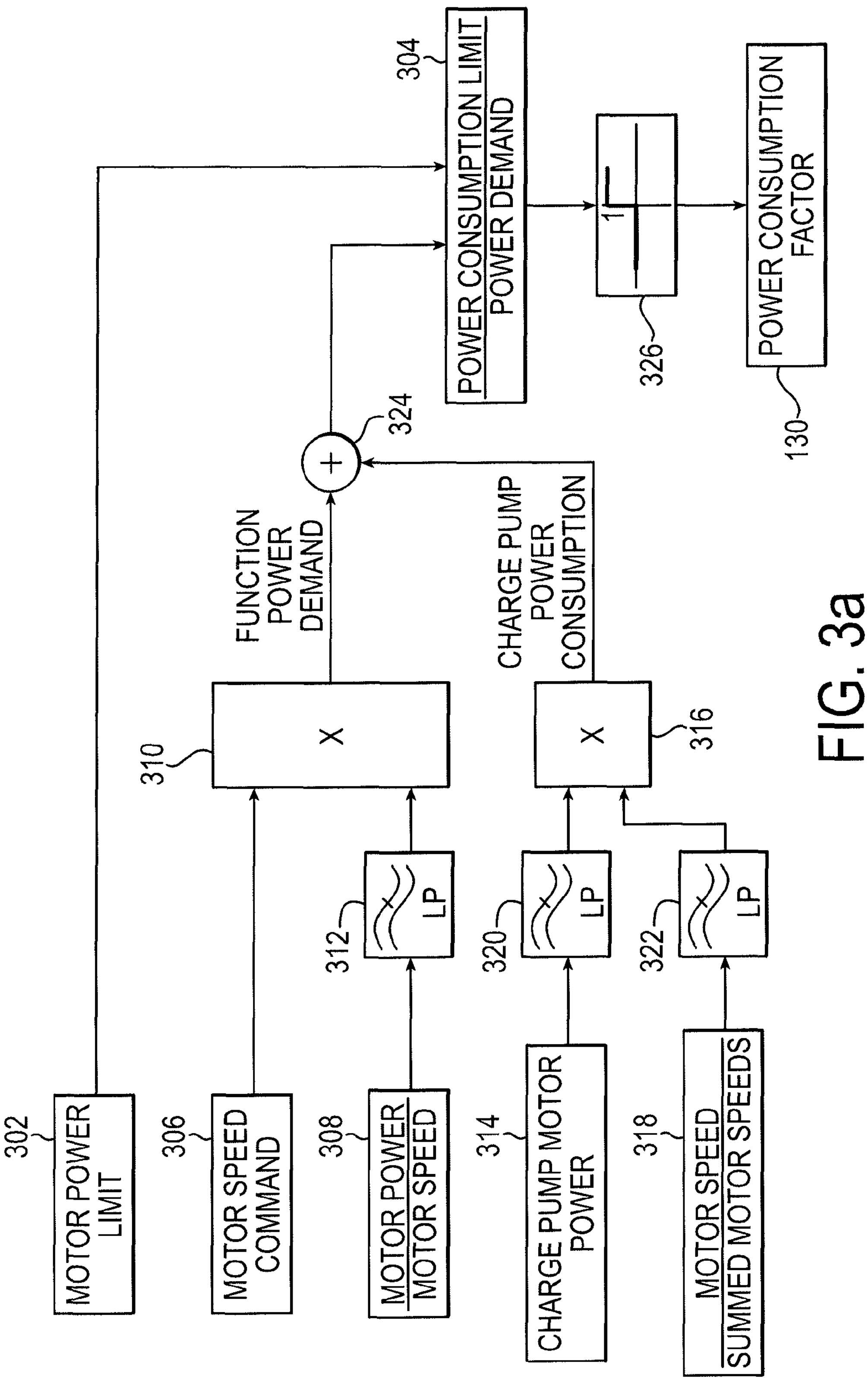
FIG. 3*a* is a control diagram illustrating an exemplary method for determining a power consumption limitation control factor for a single function.

FIG. 3*a* is a control diagram illustrating an exemplary method for determining the power consumption limitation control factor 130 for a single function. Each additional function of the system may be limited in a similar manner. When the system 10 determines the power consumption limitation control factor 130 for each function, the system controller 80 may use the lowest determined power consumption limitation control factor 130 for modifying all of the functions or, alternatively, may modify each function with its determined power consumption limitation control factor.

FIG. 3*a* illustrates the predefined maximum power consumption limit associated with the function at 302. The predefined maximum power limit 302 is input into a comparison block, illustrated at block 304 in FIG. 3*a*. The estimated power for operating the function as desired by the input signal is also provided to the comparison block 304. To determine the estimated power for operating the function, the speed of the associated electric motor as commanded by the input signal, shown at block 306, is multiplied by the actual torque of the associated electric motor, shown at block 308, in the multiplication block 310 of FIG. 3*a*.

$$P_{est}=T_{Current\ Load}\cdot\omega_{Command}$$

The estimated power is the power demand if the commanded motor speed is achieved at the actual motor torque. If the motor torque is not available directly as measured feedback, the motor torque can be calculated by dividing the instantaneous motor power by the instantaneous motor speed, as is shown below and in block 308 of FIG. 3*a*.

$$P_{est} = \frac{Power_{Instantaneous\ Feedback}}{\omega_{Instantaneous\ Feedback}}$$

The calculated motor torque is filtered by filter 312 to reduce noise prior to the multiplication block 310.

Each function may also utilize fluid from the charge pump sub-system 94 during actuation. Thus, the power demand for operating the function as desired also includes that portion of the electric power of the charge pump sub-system 94 associated with operation of the function. To allocate the appropriate portion of the electric power of the charge pump sub-system 94 to the power demand of the charge pump sub-system, shown at block 314, is multiplied in multiplication block 316 by the ratio of the speed of the associated electric motor of the function over the summation of all the electric motor speeds, shown at block 318. As the flow of fluid in each function is directly affected by the speed of the electric motor 22 or 52, the above ratio provides a sufficient indication of the demand from the charge pump sub-system 94 by the particular function. FIG. 3*a* illustrates the output of blocks 314 and 318 being filtered at blocks 320 and 322, respectively, prior to the multiplication block 316. The output of the multiplication block 316 is the portion of the electric power demand of the charge pump sub-system 94 that is allocated to this particular function. The power demand of the particular function output from multiplication block 310 and the allocated power demand of the charge pump sub-system 94 output from multiplication block 316 are summed at summation block 324 and, the output of summation block 324 is provided to the comparison block 304 as the estimated power for operating the function as desired by the input signal.

In the comparison block 304 of FIG. 3*a*, the predefined maximum power consumption limit 302 is divided by the estimated power for operating the function as desired by the input signal. The output of the comparison block 304 is provided to a limiting block 326 for limiting the output to a value in the range between 0 to 1. The output of the limiting block 326 is the power consumption limitation control factor 130 associated with the particular function.

Figure 3B:
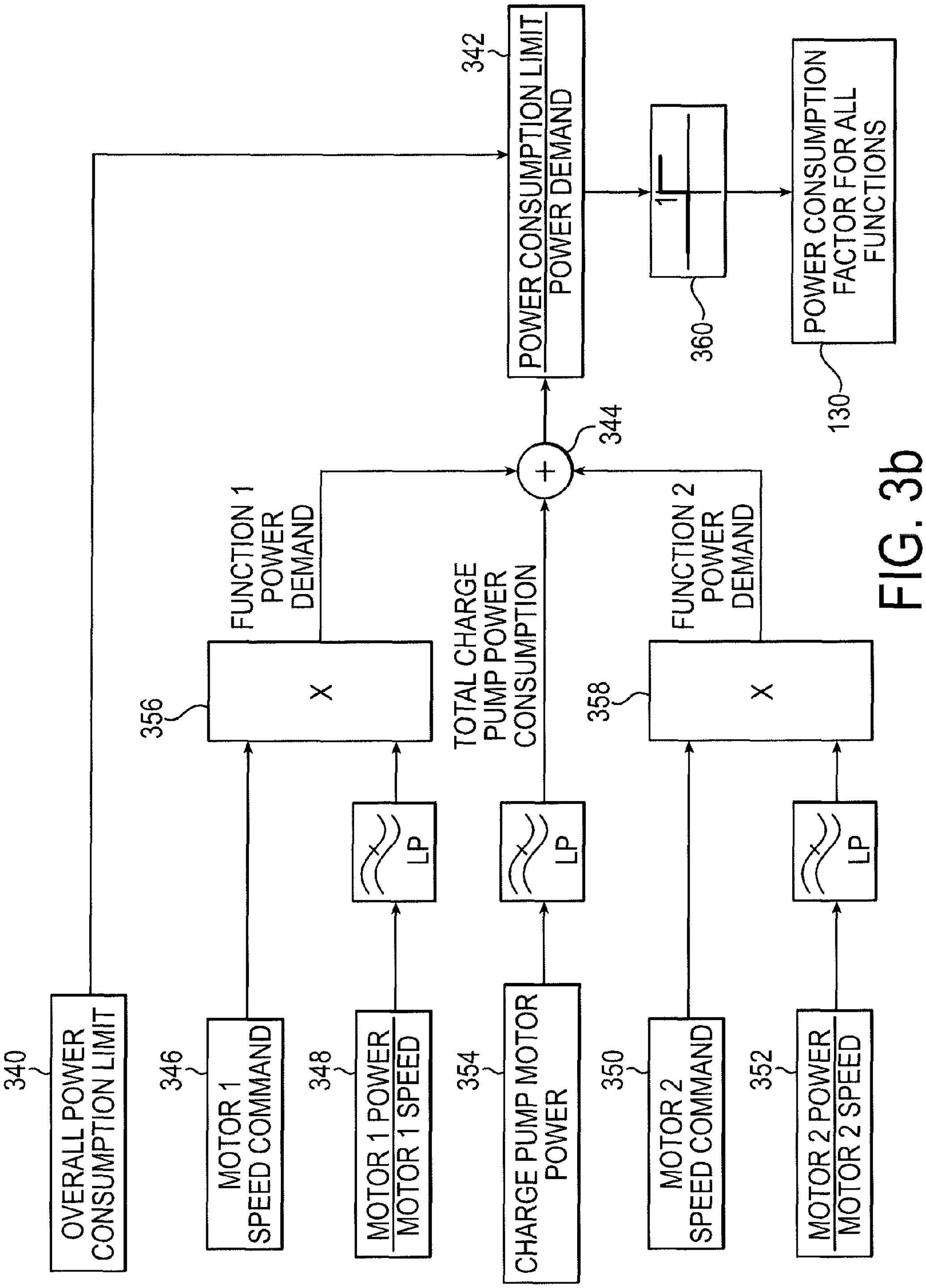
FIG. 3*b* is a control diagram illustrating an exemplary method for determining a power consumption limitation control factor for the system.

As an alternative to, or in addition to, determining a power consumption limitation control factor for each function, a power consumption limitation control factor 130 for the entire system 10 may be determined. The power consumption limitation control factor 130 for the system 10 ensures that the total demand for electric power from the all of the electric motors 22, 52, and 96 of the system 10 does not exceed the electric power available. FIG. 3*b* is a control diagram illustrating an exemplary method for determining a power consumption limitation control factor 130 for the entire system 10.

FIG. 3*b* illustrates a predefined maximum system power consumption limit at block 340. The predefined maximum system power consumption limit 340 is input into a comparison block, illustrated at block 342 in FIG. 3*b*. The estimated total power demand for the system 10 also is input into the comparison block 342.

The estimated total power demand for the system 10 is determined by summing the estimated power demand for each function 12 and 14 and for the charge pump sub-system 94 in summation block 344. The estimated power demand for each function is determined by multiplying the speed of the associated electric motor as commanded by the input signal for the particular function by the actual torque of the electric motor for that particular function. FIG. 3*b* illustrates the motor speed for function 12 at block 346 and the actual motor torque at block 348. The motor speed from block 346 and the actual motor torque from block 348 are multiplied at multiplication block 356. Similarly, FIG. 3*b* illustrates the motor speed for function 14 at block 350 and the actual motor torque at block 352. The motor speed from block 350 and the actual motor torque from block 352 are multiplied at multiplication block 358. The power associated with the charge pump sub-system 94 is illustrated at block 354 in FIG. 3*b*.

In the comparison block 342 of FIG. 3*b*, the predefined maximum system power consumption limit 340 is divided by the estimated total power demand. The output of the comparison block 342 is provided to a limiting block 360 for limiting the output to a value in the range between 0 to 1. The output of the limiting block 360 is a power consumption limitation control factor 130 associated with the system 10. This power consumption limitation control factor 130 may be used for modifying the input signals from the operator input device 82 to ensure that the predefined maximum system power consumption limit 340 is not exceeded.

The system controller 80 may use the determined power consumption limitation control factor 130 of the particular function (FIG. 3*a*) or the system (FIG. 3*b*) for modifying the input signals from the operator input device 82 for operating within the associated control limitation. As a result, the functions 12 and 14 may not achieve the speeds desired by the operator but, instead, may operate at a lower speed. The system controller 80, if desired, may maintain the speed relationships of the various functions 12 and 14 when reducing the speeds of multiple functions.

Power Generation Limitation Control Function

Figure 4:
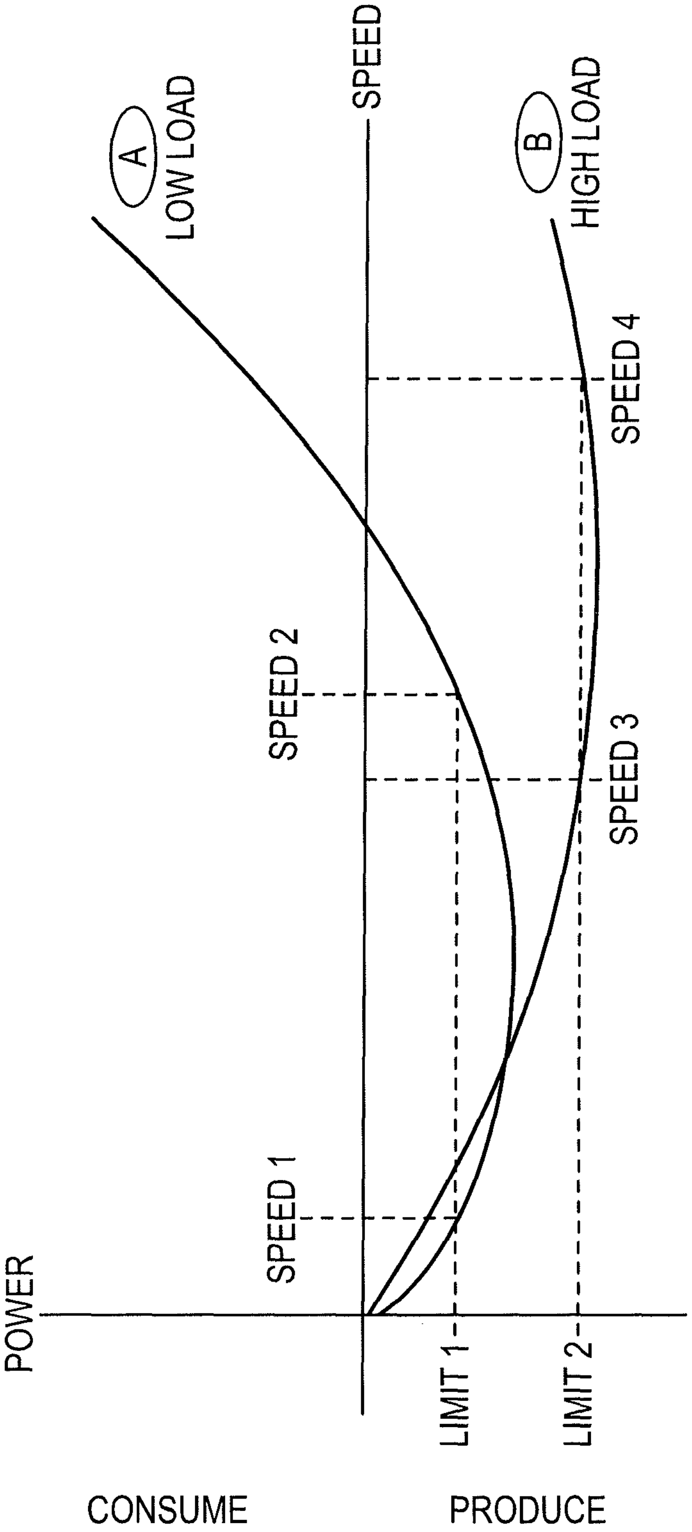
FIG. 4 is a graph illustrating characteristic power generation as function of motor speed and load.

The electric motors 22 and 52 are capable of generating electric power when the function 12 or 14 operates in a regeneration mode with the associated hydraulic pump 24 and/or 54 operating as a hydraulic motor for driving the electric motor as a generator. Referring to FIG. 4, the amount of power generated by an electric motor during operation in a regeneration mode typically is non-linear and depends on the speed of the electric motor and load experienced by the electric motor. Furthermore, there may be two different speeds that result in the same amount of generated power for a given load. For example, with reference to FIG. 4, a function in regeneration mode driven by a fixed load A generates the same amount of electric power (Limit 1) at speed 1 and at speed 2. The power generation limitation control factor 132 is used as a latching function so as to prevent a change in the motor speed without a change in the input signal from the operator input device 82. Thus, with reference to FIG. 4, the power generation limitation control factor 132 is used to latch in the operating speed, e.g., speed 1 associated with load A, when the electric motor is producing power at Limit 1 so that the speed of the electric motor does not undesirably change to the other speed associated with the production of power at Limit 1, e.g. speed 2.

Figure 5:
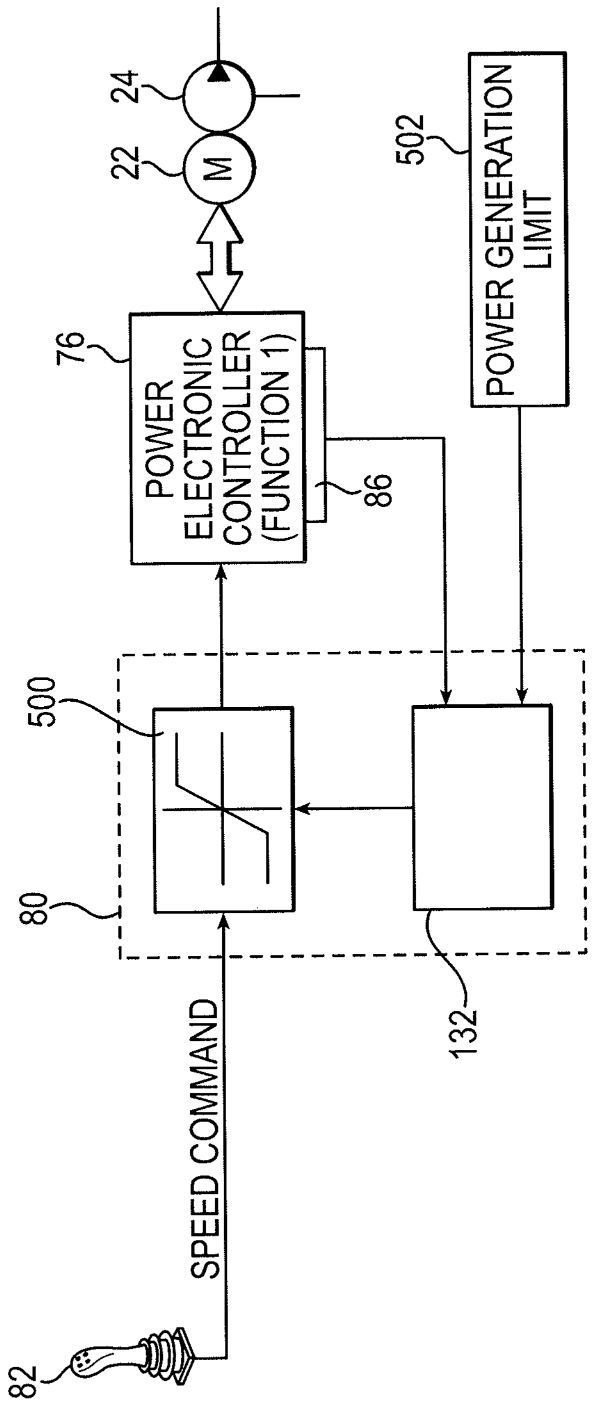
FIG. 5 is a control diagram illustrating an exemplary method in which a system controller utilizes the power generation limitation control factor.

FIG. 5 is a control diagram illustrating an exemplary method in which the system controller 80 utilizes the power generation limitation control factor 132 for function 12. A similar method is used for each additional function, e.g., function 14. The system controller 80 may be operable to always calculate a power generation limitation control factor 132 or, alternatively, may only calculate the power generation limitation control factor 132 in response to receiving an input signal that is likely to result in the generation of power, for example a lowering of a load with the assistance of gravity. As illustrated in FIG. 5, the system controller 80 receives a power generation limit from block 502 and receives the indicated motor speed from the feedback signal of the associated feedback device 86 for determining the actual speed of the electric motor 22 to be latched. The power generation limit 502 may be a predetermined value indicative of the maximum amount of power that the particular function can generator for use in the system 10. The limitation block 500 of FIG. 5 acts to latch the speed of the electric motor 22.

Figure 6A:
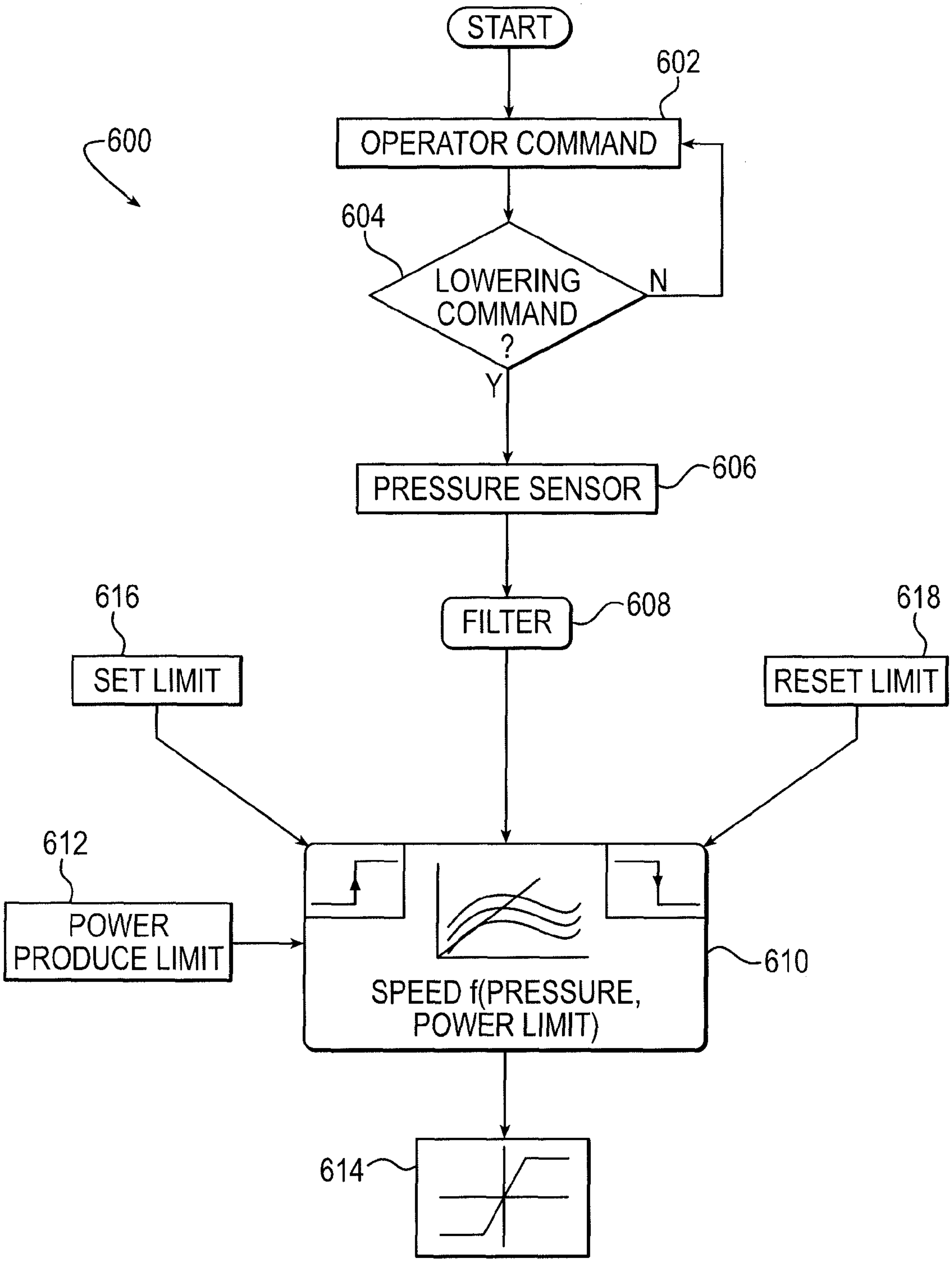
FIGS. 6*a* and 6*b* illustrate alternative a flow diagrams of methods for determining the power generation limitation control factor.

FIG. 6*a* illustrates a first exemplary method 600 for determining a power generation limitation control factor 132 for a function, e.g., function 12. The method 600 of FIG. 6*a* may be performed by a control algorithm run in the system controller 80. According to the method 600, input signals from the operator input device 82 are received by the system controller 80 at step 602. At step 604, the input signals are evaluated to determine whether the operator has commanded a lowering of the load. If the input signals do not indicate a lowering command, the method 600 returns to step 602 and subsequently received input signals are evaluated. If an input signal does indicate a lowering command, the method 600 proceeds to step 606 in which pressure sensors (not shown), or other load sensing devices, associated with the actuator 20 are monitored for providing an indication of the load. The resulting pressure signals are filtered at step 608, and the filtered pressure signals are input into a look-up table at step 610. The lookup table correlates the received pressure signals and a predetermined power generation limit from step 612 with speeds of the electric motor 22. The speed of the electric motor from lookup table 610 that is nearest the actual electric motor speed as indicated in the feedback signal from feedback device 86 is latched by the system controller 80 at step 614 when a set limit signal from step 616 is received. The set limit signal from step 616 is received based on the occurrence of one of the following conditions:

1.) If the electric motor power obtained from feedback device 86 of power electronic controller 76 exceeds the predetermined power generation limit; or
2.) When the power generation limit is changed to a new value.

The system controller 80 removes the latch in response to receipt of a reset limit signal from step 618. The reset limit signal of step 618 is provided when the input signal from the operator input device 82 commands a stop or a reverse in the direction of actuation.

Figure 6B:
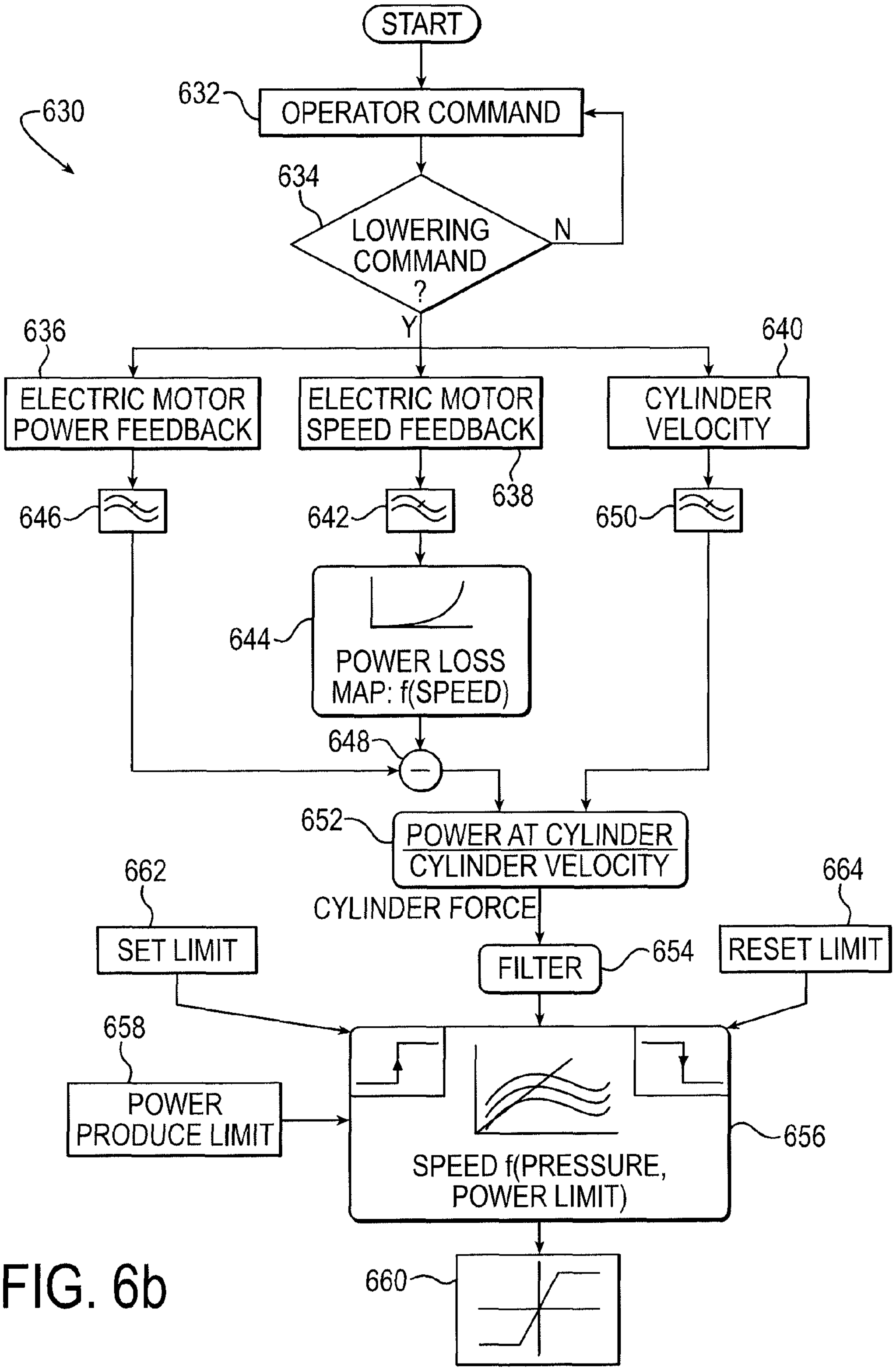

FIG. 6*b* illustrates an alternative method 630 for determining a power generation limitation control factor 132 for a function, e.g., function 12. The method 630 of FIG. 6*b* does not use a pressure signal from a pressure sensors but instead utilizes the feedback signal from the feedback device 86 of the associated power electric controller 76. Input signals from the operator input device 82 are received by the system controller 80 at step 632. At step 634, the input signals are evaluated to determine whether operator has commanded a lowering of the load. If the input signals do not indicate a lowering command, the method 630 returns to step 632 and subsequently received input signals are evaluated. If an input signal does indicate a lowering command, the method 630 proceeds to steps 636, 638, and 640. At step 638, the speed of the electric motor 22 is monitored through the feedback signal from the feedback device 86 of the associated power electronic controller 76. The monitored speed is filtered at step 642 and provided to step 644 in which an estimated hydraulic power loss is determined. In one embodiment, a lookup table is used to determine the estimated hydraulic power loss. The estimated hydraulic power loss is attributable to resistance in the hydraulic circuit. At step 636, the power of the electric motor 22 is monitored through the feedback signal from the feedback device 86. The power is filtered at step 646 and is provided to step 648. At step 648, the estimated power loss from step 644 is the subtracted from the monitored power from step 646 to obtain an estimate of hydraulic power at the actuator (power at actuator equals power at the electric motor minus hydraulic losses). The estimated hydraulic power at the actuator from step 648 is provided to step 650. Furthermore, velocity of the actuator 20 is obtained at step 640 based on signals from an actuator velocity or position sensing device or based upon an estimate determined from the monitored speed of the electric motor. The actuator velocity is filtered at step 650 and is provided to step 652.

At step 652, an estimation of the actuator force is calculated by dividing the power at the actuator from step 648 by the velocity of the actuator from step 650. The result of step 652 is filtered at step 654 and is input into a look-up table at step 656. The lookup table correlates the actuator force and a predetermined power generation limit from step 658 with speeds of the electric motor 22. The speed of the electric motor from lookup table 656 that is nearest the actual electric motor speed from step 638 is latched by the system controller 80 at step 660 when a set limit signal from step 616 is received. The set limit signal from step 662 is received based on the occurrence of one of the following conditions:

3.) If the electric motor power obtained from feedback device 86 of power electronic controller 76 exceeds the predetermined power generation limit; or
4.) When the power generation limit is changed to a new value.

The system controller 80 removes the latch in response to receipt of a reset limit signal from step 664. The reset limit signal of step 664 is provided when the input signal from the operator input device 82 commands a stop or a reverse in the direction of actuation.

Charge Pump Limitation Control

Figure 7:
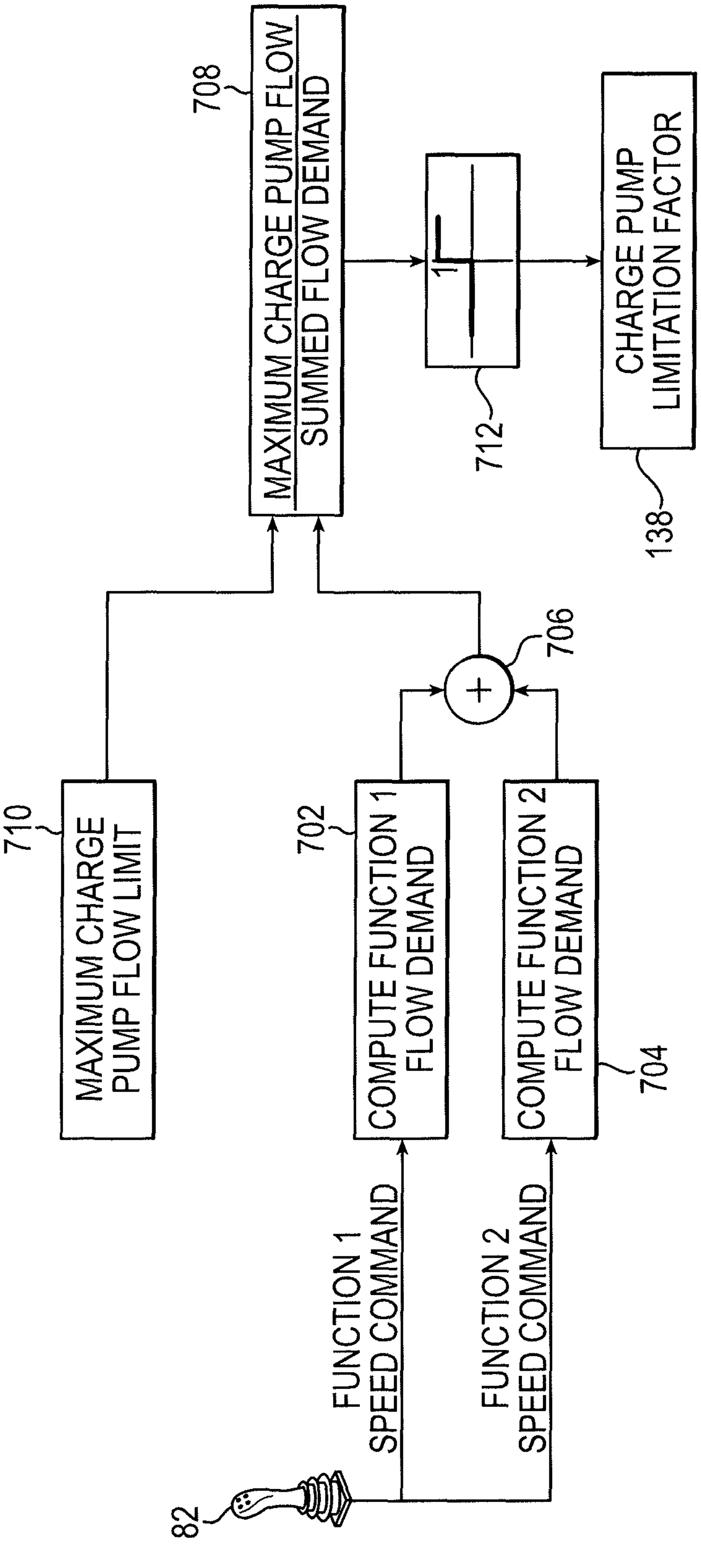
FIG. 7 is a control diagram illustrating an exemplary method for determining a charge pump limitation control factor.

FIG. 7 is a control diagram illustrating an exemplary method for determining a charge pump limitation control factor 138. The charge pump sub-system 94 is a flow management system that at least partially results from the use of one or more unbalanced hydraulic actuators, e.g., actuators 20 and 50. The charge pump limitation control factor 138 is used to ensure that actuation of the various functions does not overwhelm (or exceed the capacity of) the charge pump sub-system 94.

With reference to FIG. 7, in response to the speed components of the input signals from the operator input device 82, the flow demand for each function 12 and 14 is determined. In one example, the speed component of the input signal is input into a lookup table for determining the flow demand for each particular function 12 and 14. Alternatively, flow demands may be calculated based on sensed velocities of the actuators 20 and 50 if the actuators are equipped with appropriate feedback devices such as position or velocity sensors. In FIG. 7, the flow demand for function 12 is determined in block 702 and, the flow demand for function 14 is determined in block 704. The flow demands are summed together at summation block 706 and the resulting summed flow demand is provided to comparison block 708. In comparison block 708, the maximum available charge pump flow limit, which is a predetermined value input from block 710, is divided by the summed flow demand. The output of the comparison block 708 represents how much of the flow demand can be satisfied by the charge pump sub-system 94. This output is input into limiting block 712 and is limited to values between 0 and 1. The result is the charge pump limitation control factor 138.

By multiplying each of the input signals by the charge pump limitation control factor 138, the charge pump sub-system 94 will be capable of supporting the resulting speeds of the electric motors 22 and 52 (and corresponding actuator speeds). In one control scheme, the speeds of all actuated functions 12 and 14 will be reduced if the output of the comparison block 708 is less than one. In an alternative control scheme, each actuator 20 and 50 may be assigned a priority and higher priority actuators are allowed to consume more charge pump flow than lower priority actuators while the sum of the charge pump flows remains at or below the maximum charge pump flow.

Multiple-Function Actuation Limitation

The multiple-function actuation limitation factor 134 is optional and is used to help the system 10 mimic traditional pump supplied systems. A traditional pump supplied system includes a pump driven by a combustion engine. The pump supplies hydraulic fluid to the actuators of multiple functions. When the operator input signal actuates only one function, that function is supplied with the entire flow of fluid from the pump and moves at a high speed. When multiple functions are actuated, the fluid supplied by the pump must be shared between the multiple actuators of the multiple functions. As a result, the actuators move at a slower speed than when only one function is actuated. The multiple-function actuation limitation factor 134 acts as an electronic flow sharing control so that when two or more functions of the system 10 are actuated simultaneously, the actuators of the functions move at a speed slower than when only one function is actuated.

Figure 8:
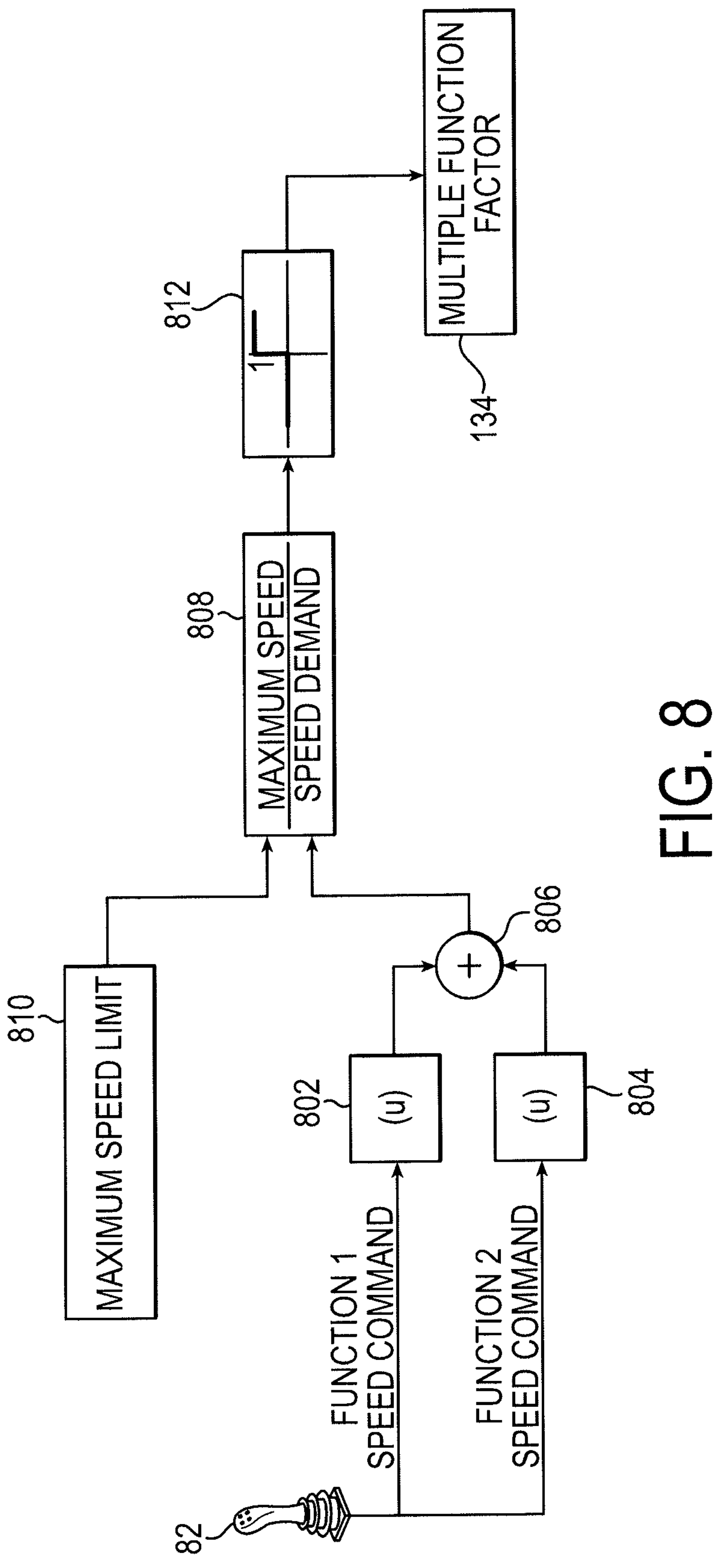
FIG. 8 is a control diagram illustrating an exemplary method for determining a multiple-function speed limitation control factor.

FIG. 8 is a control diagram illustrating an exemplary method for determining a multiple-function speed limitation control factor 134. Input signals are received from the operator input device 82. The input signals include speed and direction components for controlling actuation for the various functions, e.g., functions 12 and 14. At block 802, the absolute value of the speed component for function 12 is determined. At block 804, the absolute value of the speed component for function 14 is determined. The determined absolute values of blocks 802 and 804 are summed at a summation block 806 and, the resulting summation is provided to a comparison block 808. In the comparison block 808, a predetermined maximum speed limit for the motors, received from block 810, is divided by the resulting summation from summation block 806. The output of the comparison block 808 is provided to a limiting block 812 in which it is limited to a value between 0 and 1. The output of the limiting block 812 is the multiple-function speed control factor 134.

For example, in the system 10 of FIG. 1 with the input signals indicating electric motor 22 having a speed of 50 rpm and electric motor 52 having a speed of 70 rpm, with the predetermined maximum speed from block 810 of FIG. 8 being 100 rpm, the multiple-function actuation control limitation factor equals 0.83 (100 rpm divided by 120 rpm). If the speed component of each input signal from the operator input device 82 is multiplied by the multiple-function actuation control factor 134, the resulting modified motor speeds will maintain their relationship to each other and, at the same time, the sum of the modified motor speeds will not exceed the maximum speed value, 100 rpm in this example. As a result of the reduced speeds, the system will mimic that of a traditional hydraulic system.

As an option, direction dependent speed limits may be used. For example, if both functions 12 and 14 are commanded in the same positive direction, a first predetermined maximum speed value may be applied. If both functions 12 and 14 are commanded in the same negative direction, a second predetermined maximum speed value may be applied. The second predetermined maximum speed value may be the same as or may be different from the first predetermined maximum speed value. If the functions 12 and 14 are actuated in opposite directions, a third predetermined maximum speed value may be applied. The third predetermined maximum speed value may be the same as or may be different from one or both of the first and second predetermined maximum speed values. Furthermore, this concept can be applied to more than two functions when the system includes more than two functions.

Power Bus Voltage Limitation Control

Figure 9:
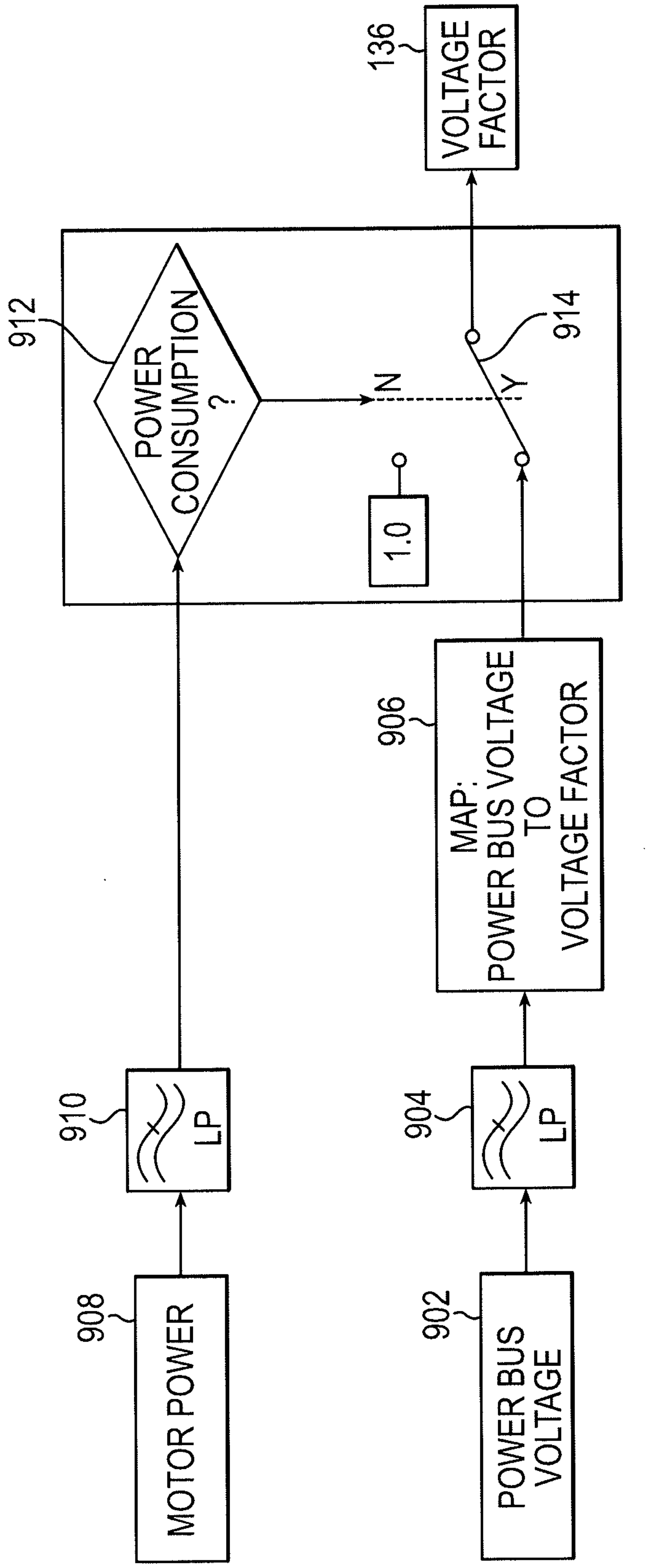
FIG. 9 is a control diagram illustrating an exemplary method for determining a power bus voltage limitation control factor.

The voltage level on the power bus may fluctuate depending on the operation of the internal combustion engine 118, the electric generator 116 and the electric motors 22 and 52. In order to avoid high power demands being drawn from the electric storage unit 114 as bus voltage decreases, the system 10 reduces power demand of the electric motors 22 and 52 as bus voltage decreases so as to protect the electric storage unit and the electrical system in general. The electric motors 22 and 52 continue to operate in regions of achievable torque-speed combinations. FIG. 9 is a control diagram illustrating an exemplary method for determining a power bus voltage limitation control factor 136 for one function, e.g., function 12. Other functions may be controlled in the same or similar manner.

Power bus voltage is monitored through voltage measurement at block 902 and is low-pass filtered in to reduce noise at block 904. The monitored voltage represents the voltage available for use in the system. A map for correlating available voltage for the system to a voltage limitation control factor is illustrated at block 906. Some exemplary maps will be discussed in further detail below with reference to FIGS. 10*a*-10*d*. As an alternative to a map, a lookup table may be uses. The map is based upon voltage limits of the system and on minimum voltage requirements for electric components connected to the power bus, such as, e.g., the power electronic controllers 76, 78, and 100 and electric motors 22, 52, and 96, as well as desired discharge characteristics of the electric storage unit 114. The voltage limitation control factor is a value between 0 and 1 that is obtained by applying the monitored voltage from block 902 to the map of block 906. Motor power is monitored at block 908. The motor power may be monitored by sensors located in the feedback device 86 of the associated power electronic controller 76 or in the electric motor 22 itself. The monitored motor power is low-pass filtered at block 910 and is evaluated at block 912 to determine whether the electric motor 22 is consuming power. Block 912 controls a switching function, illustrated at block 914 in FIG. 9. When the decision at block 912 is affirmative and the electric motor 22 is consuming power, the switching function 914 outputs the voltage limitation control factor from the map of block 906 as the power bus voltage limitation control factor 136. When the decision at block 912 is negative and the electric motor 22 is not consuming power, the switching function 914 sets the power bus voltage limitation control factor 136 equal to one.

Figure 10A:
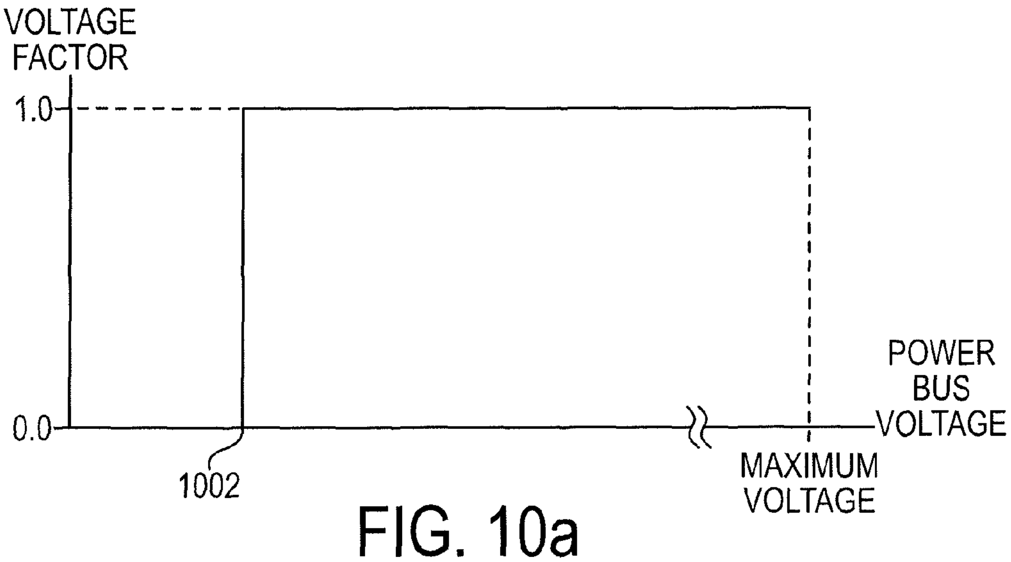
FIGS. 10*a*, 10*b*, 10*c* and 10*d* illustrate exemplary power bus voltage to voltage factor maps.
Figure 10B:
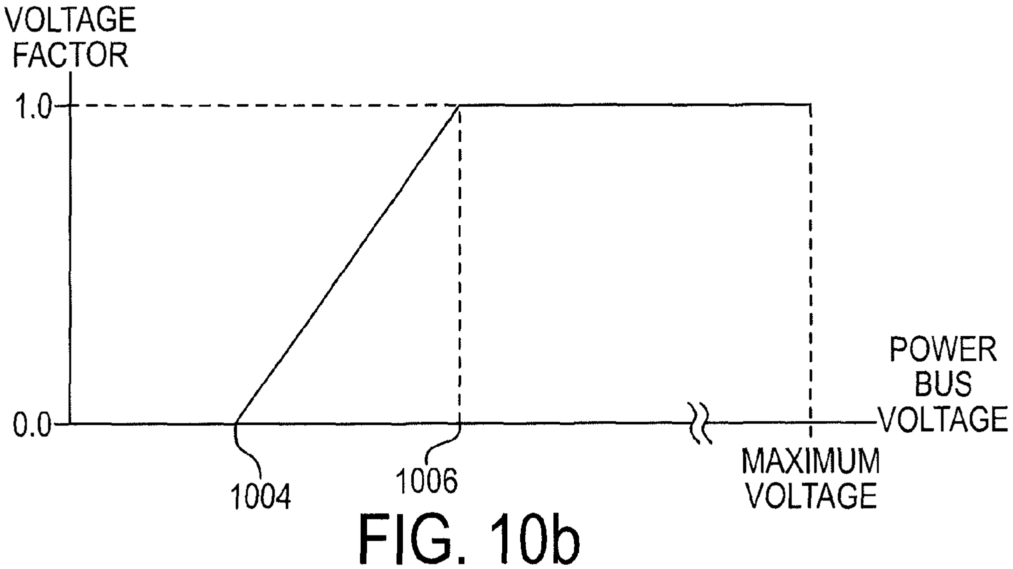
Figure 10C:
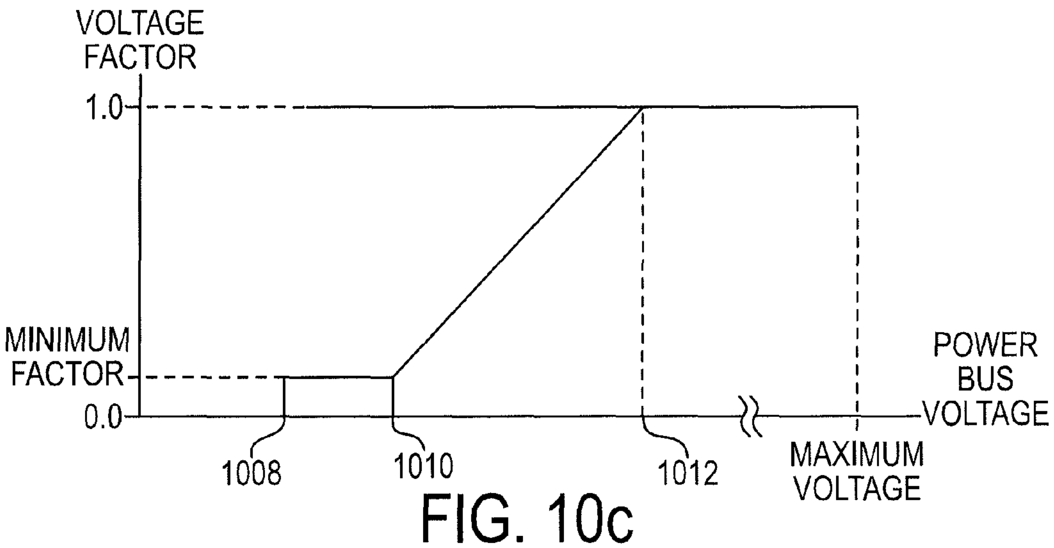
Figure 10D:
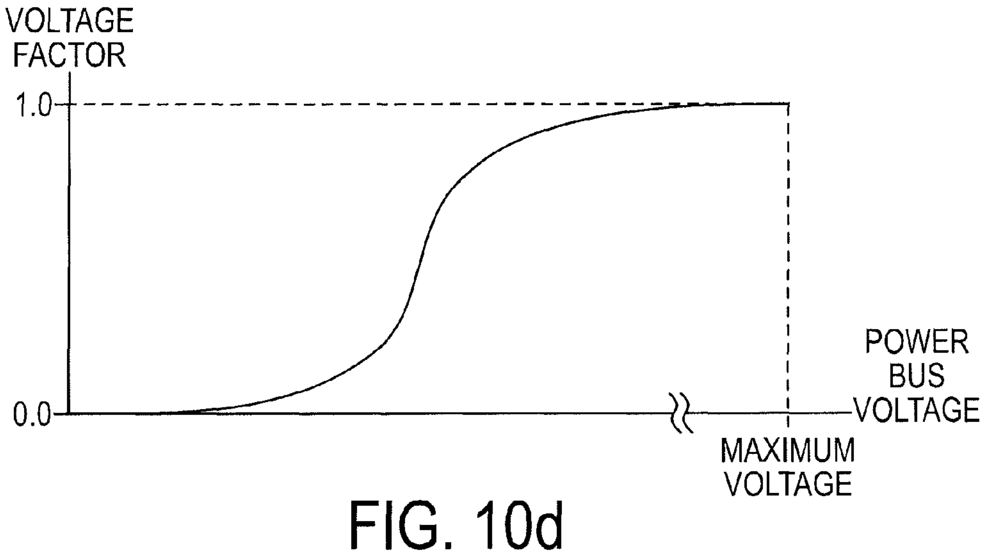

The power bus voltage to voltage limitation control factor (or voltage factor) map of block 906 may be designed depending on system and component characteristics or other specifications. Several possible maps are illustrated in FIGS. 10*a*-10*d*. In FIG. 10*a*, the voltage factor is zero when the power bus voltage falls below a predetermined level 1002 and, the voltage factor is one when the power bus voltage is equal to or greater than the predetermined level. In FIG. 10*b*, the voltage factor is zero when the power bus voltage falls below a first predetermined level 1004 and, the voltage factor is one when the power bus voltage is equal to or greater than a second predetermined level 1006. Between the first and second predetermined levels 1004 and 1006, the voltage factor is scaled proportionally between zero and one. When operating with the map of FIG. 10*b*, the electric motor gradually slows down as power bus voltage decreases. In FIG. 10*c*, the voltage factor is zero when the power bus voltage falls below a first predetermined level 1008. Between the first predetermined level 1008 and a second predetermined level 1010, the voltage factor is set to a minimal value greater than zero, such as, e.g., 0.18. Between the second predetermined level 1010 and a third predetermined level 1012, the voltage factor is scaled proportionally between zero and one. Above the third predetermined level 1012, the voltage factor is equal to one. This arrangement allows for low speed operation of the electric motor under very low power bus voltages before shut-down. FIG. 10*d* illustrates a variable mathematical function that may be used to dynamically compute a Voltage Factor depending on operating conditions or system and component characteristics.

System Controller

Figure 11:
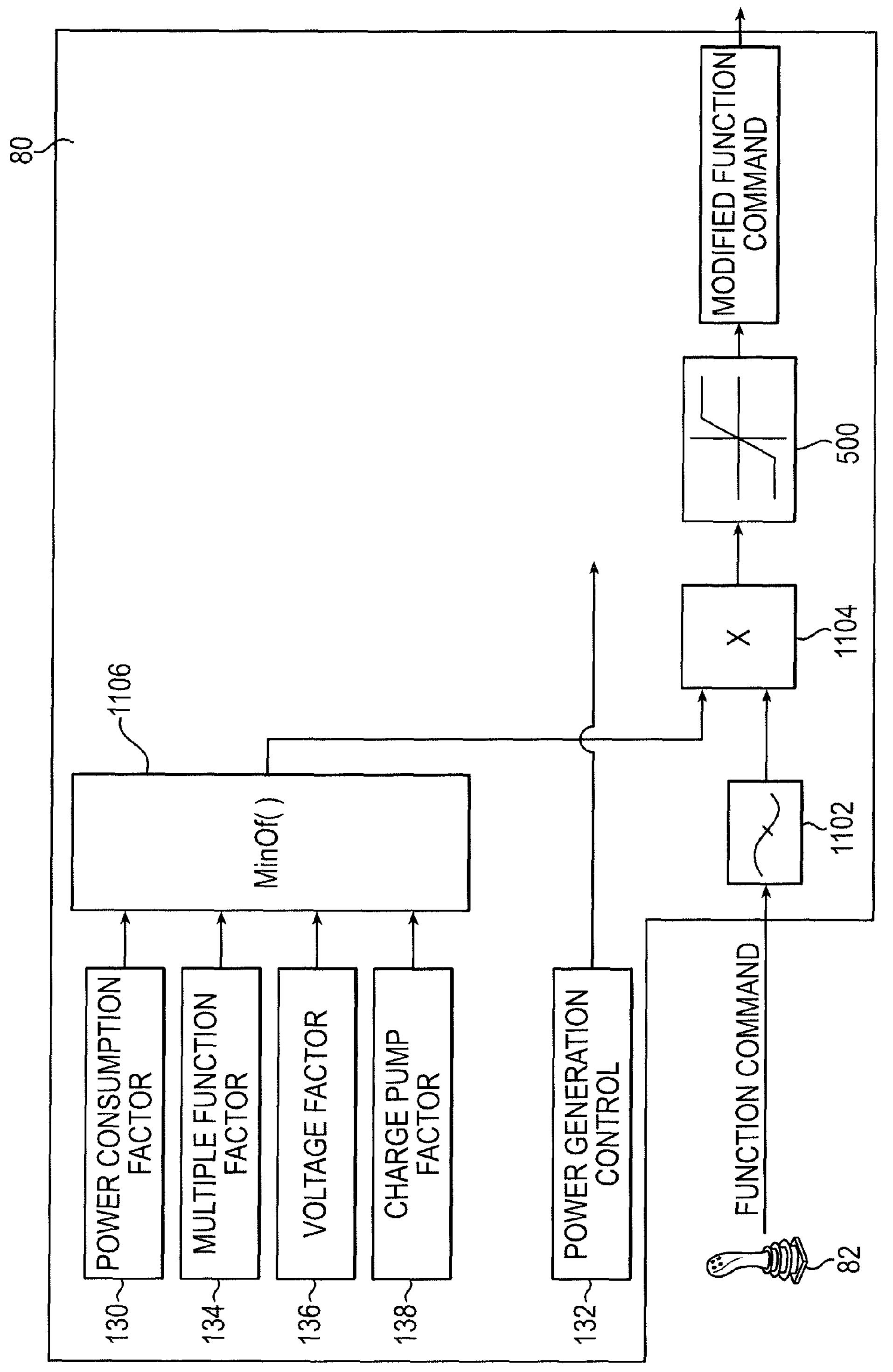
FIG. 11 is a control diagram illustrating an exemplary method of processing multiple limitation control factors.

FIG. 11 is a control diagram illustrating an exemplary method of processing multiple limitation control factors. An input signal for a particular function is received in the system controller 80 from an operator input device 82. The input signal is filtered in block 1102 and is provided to a multiplication block 1104. The system controller 80 also includes a minimum value determination block 1106 that is operable for comparing multiple inputs and outputting the lowest one of the multiple received inputs. In the embodiment illustrated in FIG. 11, the minimum value determination block 1106 receives the power consumption limitation control factor 130, the multiple function limitation control factor 134, the power bus voltage limitation control factor 136, and the charge pump limitation control factor 138. The minimum value determination block 1106 outputs the factor having the lowest value to the multiplication block 1104 for multiplication with the filtered input signal. The output of the multiplication block 1104 is input into limiting block 500. Limiting block 500 is responsive to the power generation limitation control factor 132 for latching the speed of the electric motor, as described with reference to FIG. 5. The output of the limiting block 500 is a modified input signal for commanding operation of the electric motor of the particular function.

Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention.

What is claimed is:

1. A method of controlling an electro-hydraulic actuator system having multiple functions, the method comprising the steps of:

receiving, at a controller, input signals corresponding to a desired operation of the functions of the system;

determining by the controller an operating limit for the system;

determining an operating characteristic of the system by the controller;

wherein the controller processes the operating limit and the determined operating characteristic to determine a limitation control factor; and modifying the received input signals with the determined limitation control factor by the controller for operating the system within the established operating limit, wherein the step of determining an operating limit for the system includes the step of determining a power consumption limit, wherein processing the operating limit and the determined operating characteristic to determine a limitation control factor includes the step of dividing the determined power consumption limit by the determined operating characteristic and limiting a result to a value between zero and one, wherein the power consumption limit includes determining the power consumption limit for one of the functions and, the step of determining an operating characteristic of the system includes the steps of calculating a power demand for an electric motor of the one function when actuated with the input signals, calculating an allocated power demand from a charge pump sub-system associated with the one function, and summing the calculated electric motor power demand and the calculated charge pump demand.

2. The method of claim 1, wherein the step of determining an operating limit for the system includes the step of determining a power generation limit for one of the functions of the system and, the step of modifying the received input signals with the determined limitation control factor includes the step of latching a speed of an electric motor of the one function.

3. The method of claim 2, wherein step of processing the operating limit and the determined operating characteristic to determine a limitation control factor only occurs in response to an input signal associated with the one function being likely to result in the one function generating power.

4. The method of claim 2, wherein the step of determining an operating characteristic of the system includes the step of determining a condition related to a load of the function.

5. A method of controlling an electro-hydraulic actuator system having multiple functions, the method comprising the steps of:

receiving, at a controller, input signals corresponding to a desired operation of the functions of the system;

determining by the controller an operating limit for the system;

determining an operating characteristic of the system by the controller;

wherein the controller processes the operating limit and the determined operating characteristic to determine a limitation control factor; and modifying the received input signals with the determined limitation control factor by the controller for operating the system within the established operating limit, wherein the step of determining an operating limit for the system includes the step of determining a power consumption limit, wherein processing the operating limit and the determined operating characteristic to determine a limitation control factor includes the step of dividing the determined power consumption limit by the determined operating characteristic and limiting a result to a value between zero and one, wherein the step of determining a power consumption limit includes the determining a power consumption limit for the system and, the step of determining an operating characteristic of the system includes the steps of calculating a power demand for an electric motor of each function, calculating a power demand from a charge pump sub-system, and summing the calculated electric motor power demands and the calculated charge pump demand.

6. The method of claim 5, wherein the step of determining an operating limit for the system includes the step of determining a power generation limit for one of the functions of the system and, the step of modifying the received input signals with the determined limitation control factor includes the step of latching a speed of an electric motor of the one function.

7. The method of claim 6, wherein step of processing the operating limit and the determined operating characteristic to determine a limitation control factor only occurs in response to an input signal associated with the one function being likely to result in the one function generating power.

8. The method of claim 6, wherein the step of determining an operating characteristic of the system includes the step of determining a condition related to a load of the function.

* * * * *